United States Patent Office 2,955,943
Patented Oct. 11, 1960

2,955,943

DEHYDRATION OF FRUIT AND VEGETABLE JUICES

Arthur I. Morgan, Jr., Berkeley, and Lewis F. Ginnette, San Leandro, Calif., assignors to the United States of America as represented by the Secretary of Agriculture No Drawing. Filed Dec. 16, 1958, Ser. No. 780,903

5 Claims. (Cl. 99—206)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of improved processes for dehydrating fruit and vegetable juices. A particular object of the invention is the provision of processes wherein the dehydration is conducted under atmospheric pressure to yield porous products which can be rapidly and easily reconstituted to form a juice having flavor, color, and nutrient value essentially the same as the original juice. Further objects and advantages of the invention will be apparent from the following description.

In the dehydration of fruit and vegetable juices a principal problem lies in the difficulty of obtaining products which will reconstitute readily. The mere subjection of juices to conventional dehydrating conditions such as exposing them to hot air or to the heated surface of a drum dryer will yield a dense, leathery product which has no practical value as it is virtually impossible to reconstitute. Recently, it has been shown that fruit and vegetable juices can be successfully dried by exposing a layer of concentrated juice to vacuum under temperature conditions at which the juice remains in a puffed or expanded condition. Although this process yields an excellent product, it requires expensive equipment because the drying mechanism must be in a vacuum-tight system and the maintenance of the vacuum by steam ejectors or the like during the dehydration involves a considerable expense.

In accordance with the present invention the dehydration is accomplished under normal (atmospheric) pressure instead of under vacuum. Despite this departure from currently accepted procedures, the dehydrated products of the invention are in a porous condition and are easily rehydratable. In addition, the dehydration is accomplished without material damage to the color, flavor, and nutritive content of the juice. Since the dehydration is carried out at normal pressures, relatively inexpensive equipment may be used and operating expenses are minimized.

The essential steps in the process of the invention are—

(a) A liquid concentrate of the juice is converted into a stable foam by incorporating therewith a minor proportion of a hydrophilic colloid and a substantial volume of air or other gas.

(b) The foam in the form of relatively thin layer is exposed to a current of hot air until it is dehydrated.

The foam consists of a body of the juice concentrate throughout which is interspersed a multitude of gas bubbles. The presence of the bubbles gives the foam a volume substantially greater than that of the juice concentrate, per se. During the dehydration step, the mass of foam retains this expanded volume with the result that the final product is a brittle, sponge-like, porous mass consisting of a matrix of solid fruit or vegetable material in which is interspersed a multitude of voids. This porous mass can be easily crushed to form a product in the form of flakes. These flakes on addition to water and stirring by hand for a few seconds form a reconstituted juice free from lumps or other undispersed particles. The fact that the initial concentrate is applied to dehydration in the form of a foam and that the volume thereof is maintained during dehydration are the keys to the formation of the easily rehydrated porous product. Moreover, by such means the dehydration takes place rapidly and efficiently because moisture can diffuse readily out of the expanded mass.

In preparing the foam, a non-toxic hydrophilic colloid is added to the liquid juice concentrate and air or other non-toxic gas such as nitrogen, carbon dioxide, nitrous oxide, helium, propane, n-butane, isobutane, dichlorodifluoromethane, trichloromonofluoromethane, trifluoromonochloromethane, etc. is incorporated therein. The chemical nature of the hydrophilic colloid is of no moment in the operability of the invention as long as it possesses the ability to stabilize foams. Various examples of suitable compounds are listed hereinafter. The proportion of hydrophilic colloid will vary depending on the properties of the juice concentrate, the properties of the colloid in question, etc. In general, the proportion of hydrophilic colloid may vary about from 0.1 to 4.0%, by weight based on the weight of solids in the concentrate. It is naturally desirable to use the lowest proportion of the colloidal material compatible with production of a stable foam. Thus in any particular case, pilot trials may be conducted with different proportions of the colloidal material and noting the stability of the foams after incorporation of gas. The stability of the foams may be easily determined by allowing the test batches of foam to stand at room temperature. A suitably stable foam is one which will retain its volume without any separation of gas from liquid for at least ½ hour, preferably at least 1 hour, when allowed to stand at room temperature.

Incorporation of the gas into the concentrate containing added colloidal substance may be accomplished by any of the conventional methods used for example in aerating ice cream, salad dressings, and the like. A simple and efficacious expedient is to subject the concentrate to a rotating wire whip which beats air into the material. Another plan is to pump the concentrate through a conduit, a portion of which is of restricted cross-section to form a venturi, the gas being introduced at the zone of high velocity and low pressure within the venturi and so thoroughly commingled with and dispersed into the concentrate. For best results, it is preferred that the gas bubbles in the foam be of uniform small size, i.e., about 100 microns or less in diameter. The proportion of gas incorporated into the concentrate is generally regulated so that the gasified concentrate (foam) has a volume at least 1.5 times that of the concentrate prior to introduction of the gas. It is usually preferred that the foam have a volume about 2 to 3 times the volume of the concentrate to ensure formation of a highly porous dehydrated product. The foam volume may be increased above these levels to obtain even more highly porous products. Usually, however, it is desirable to limit the volume increase to about 5 times the original concentrate volume to avoid getting products having too low bulk density. That is, if excessive amounts of gas are added to the concentrate the dehydrated products although otherwise completely suitable from the standpoint of rehydration, taste, and color, will require too large a container to package a unit weight of product.

The concentrate may be cooled during introduction and dispersion of the gas therein; this generally promotes formation of a stable foam. If cooling is employed, any temperature below room temperature may be used provided the mass is not cooled enough to freeze it. Accordingly, temperatures not lower than about 35° F. are recommended.

Having prepared a foam as above described, the foam is spread out in a relatively thin layer and subjected to dehydration at atmospheric presure by contact with heated air. The thickness of the layer of foam may be varied. Generally, layers about 1/8 inch to 1/2 inch give satisfactory results. Various types of dehydration equipment may be employed. For example, one may use a conventional cabinet drier wherein trays bearing the layer of gasified concentrate are subjected to a current of heated air. The trays may be imperforate or of screen material if the openings are not over about 1/16 inch. The foam will not pass through perforations of such screens. Continuous dehydrators of various types may be used, for example, driers equipped with mechanical drive arrangements to move trays bearing the foam through the apparatus while they are subjected to currents of hot air moving in concurrent, countercurrent, or cross-wise direction. The drier may be compartmentalized so that the advancing trays bearing the foam may be subjected to air currents at different velocities, temperatures, and directions. Devices of the continuous belt type may also be employed. A typical device of this kind includes an endless belt of neoprene which is traversed by suitable drive means. The foam is applied to the outer surface of the belt by a roller device or other suitable applicator. The layer of foam is then transported by the belt through a zone wherein it is contacted with currents of hot air to effectuate the dehydration. The dehydrated material is preferably cooled before removal from the belt. This can be accomplished, for example, by contacting the dehydrated material with a current of cool air. Preferably the air used in this step is of low humidity to avoid moisture regain by the product. The cooled, dehydrated product is then removed from the belt by stretching the upper surface of the belt by change of direction over a pulley of small radius. When such stretching is applied, the product is broken into flakes and dislodged from the belt. The dehydration equipment, whether of batch or continuous type, may be provided with infra-red or other radiant heaters to provide auxiliary heat to the layer of foam undergoing dehydration.

In the dehydration, the layer of foam is contacted with hot air. The air temperature may range from about 120 to 220° F., the higher air temperatures in this range providing more rapid elimination of moisture. As noted hereinabove, a critical feature of the process of the invention is that the volume of the foam is retained during dehydration, thereby the final product is in a porous, easily reconstituted form. To ensure such a result, the foam layer may be kept under observation during dehydration and the temperature of the air reduced if the foam shows a tendency to decrease in volume. Thus, although it is desirable to use a high air temperature to obtain a rapid elimination of moisture, the air temperature should not be so elevated as to cause any substantial reduction in the volume of the foam. It is impossible to set forth numerical temperature limits in this connection because the stability of the foam will depend on many factors including efficacy of the colloidal substance, temperature of the foam, moisture content of the foam, proportion of dissolved solids and insoluble solids in the foam, state of subdivision of the insoluble solids in the foam, chemical nature of fruit or vegetable materials in the foam, size of gas bubbles in the foam, rate of heating of the foam, softening temperature of the product, etc. However, in any particular instance the air temperature may be controlled in accordance with visual observation and this system of control affords a more reliable guide than could numerical limits.

It is evident that during the dehydration the temperature of the product will rise and eventually equal that of the hot air stream. To avoid possibility of flavor damage by the product assuming too high a temperature, it is preferred to lower the air temperature in the final stages of the dehydration. Thus for example the air temperature in the final stage of dehydration may be at a maximum of 120° to 160° F. whereby the product temperature will not rise above these limits.

After contacting the layer of foam with hot air as described above there is produced a solid dehydrated product having essentially the same volume as the foam and in a porous, spongy form. The product will generally have a moisture content of about 5%, or less. Generally, it is preferred to cool the dehydrated product before removing it from the tray, belt, or other equipment on which it was dehydrated. The cooling may be effected by contacting the product with a current of cool, preferably dry, air. Generally, the dehydrated product is cooled to about 70–100° F. and in such condition is especially brittle and easy to remove from the surface on which it is located. The product breaks up on contact with spatulas or scrapers into a mass of flakes or particles. In such form the product is ready for use or packaging.

In preparing the foam for dehydration it is necessary to start with a juice in liquid concentrate form. Juices in their normal state are too thin and watery to form stable foams. The invention may be applied to liquid juice concentrates prepared from any fruit or vegetable, for example, orange, grapefruit, lemon, lime, apple, pear, apricot, strawberry, raspberry, pineapple, grape, prune, plum, peach, cherry, tomato, celery, carrot, spinach, lettuce, cabbage, watercress, etc. The juices may be prepared by subjecting the edible portions of the fruit or vegetable materials to such operations as reaming, pressing, macerating, crushing, comminuting, or extracting with water. The juice may be clear or contain suspended pulp. Methods of forming fruit and vegetable juices into liquid concentrates are well known in the art. A typical method involves evaporating the juice under vacuum at a temperature of 50 to 150° F. to avoid heat damage to the product. For use in the process of the invention, the concentrate should have a solids content of at least 20% by weight. There is no upper limit in the solids content as long as the concentrate is liquid. Depending on the concentration of solids and the proportion of suspended pulp, the concentrates may be syrupy, sauce-like or even of pasty consistency. Any such materials are considered as being liquids since they have fluid properties. It is generally preferred to employ concentrates which have as high a solids content as is compatible with retention of fluid character, whereby the proportion of moisture which must be removed in the dehydration step in accordance with the invention is minimized.

As noted hereinabove, a hydrophilic colloid is incorporated into the liquid juice concentrate so as to enable formation of a stable foam when the gas is added. The chemical nature of the colloidal substance is of no concern to the operativeness of the process as long as the agent has the ability to stabilize foams. A multitude of such substances are known in the art and the invention encompasses the use of any of them. Typical examples of hydrophilic colloids which may be used in the process of the invention are listed below by way of illustration and not limitation: soluble starch, sodium carboxymethyl cellulose, methyl cellulose, polyvinylpyrrolidone, agar, gum tragacanth, gum arabic, gum acacia, gum karaya, carragheen, alginic acid, sodium alginate, pectin, dextran, sodium carboxymethyl starch, sodium carboxymethyl amylose, sodium carboxymethyl amylopectin, pentosans, albumin, gelatin, sodium gluten sulphate, sodium gluten phosphate, dried egg white, dried glucose-free egg white, and the like. Particularly preferred for use in accordance with the invention is albumin and substances containing albumin such as dried egg white products.

Although it is preferred to employ a hydrophilic colloid as the sole stabilizing agent in preparing the foams, it is within the purview of the invention to supplement the stabilizing effect by employing both a hydrophilic colloid and a surface active agent. For this purpose one may employ any edible surface active agent which has the ability to stabilize foams. Typical examples of such substances are: sorbitan higher fatty acid esters such as sorbitan monolaurate, sorbitan monopalmitate, sorbitan monooleate, and the like; condensation products of ethylene oxide with sorbitan higher-fatty acid esters such as polyoxyethylene sorbitan monopalmitate, polyoxyethylene sorbitan monosterate, polyoxyethylene sorbitan monooleate; condensation products of ethylene oxide with higher fatty acids, for example, polyoxyethylene monostearate, polyoxyethylene monopalmitate, polyoxyethylene monooleate, etc.; esters of sucrose with higher fatty acids such as sucrose mono- (or di-) laurate, myristate, palmitate, stearate, oleate, etc.; bile salts as obtained from animal sources or alkali metal salts of individual bile acids; lecithin; etc.

The invention is further demonstrated by the following illustrative examples wherein parts or percentages are by weight unless otherwise designated.

EXAMPLE I

Preparation of foam

The starting material was a tomato juice concentrate containing 30% solids and of a pasty consistency. Into 100 parts of this concentrate was incorporated 0.45 part of dried hen egg albumen (1.5% based on solids content of concentrate). The albumen-containing concentrate was then whipped with a power-operated egg beater, rotated at 500–700 r.p.m. for 5 minutes. A foam having a volume 2.5 times that of the original concentrate was produced. A sample of this foam on standing at room temperature for 2 hours showed no change in height.

EXAMPLE II

Samples of the foam produced as described in Example I were spread on trays in layers 1/8" to 1/4" thick. The trays carrying the foam layers were then placed in a cabinet type drier where they were subjected to hot air streams at 160°–180° F. until dehydration was complete (final moisture content about 5%). The velocity of the air streams in each case was about 100–200 ft. per minute.

In the following table are given the foam thickness, air temperature, and time for dehydration for each run.

| Run | Foam thickness, inches | Air temperature, °F. | Drying time, minutes |
|---|---|---|---|
| A | 1/4 | 160 | 90 |
| B | 1/8 | 180 | 45 |
| C | 3/16 | 170 | 60 |
| D | 1/4 | 180 | 60 |

After dehydration was complete, the products were cooled to room temperature in a dry atmosphere to prevent re-absorption of moisture. It was observed that all the products had a porous texture and the reduction in thickness of the layers during dehydration amounted to less than 10%. By applying a spatula to the trays the products parted from the trays readily and broke up into flakes. These flakes exhibited good rehydration properties. Thus by adding a suitable quantity of water and hand stirring with a spoon, reconstituted liquids free from lumps or grittiness were produced in 30 seconds or less. The proportions of dried product and water could be varied to obtain a reconstituted juice, a reconstituted concentrate or paste as desired. The reconstituted liquids showed no tendency of phase separation.

Having thus described our invention, we claim:

1. A process for preparing a dehydrated product from a liquid concentrate selected from the group consisting of fruit juice concentrates and vegetable juice concentrates which comprises incorporating into the concentrate a gas and a minor proportion of a hydrophilic colloid to form a stable foam, spreading the foam into a relatively thin layer, contacting the layer of foam, at atmospheric pressure, with hot air having a temperature, within the range from about 120 to 220° F., insufficiently high to cause the foam to decrease in volume and continuing said contact of the hot air with the foam until the foam is dehydrated to a solid, porous, readily rehydratable product.

2. A process for preparing a dehydrated product from liquid tomato juice concentrate which comprises incorporating into the said concentrate a minor proportion of a hydrophilic colloid, whipping air into the concentrate to form a stable foam, spreading the foam into a relatively thin layer, contacting the layer of foam, at atmospheric pressure, with hot air having a temperature, within the range from about 120 to about 220° F., insufficiently high to cause the foam to decrease in volume, and continuing said contact of the hot air with the foam until the foam is dehydrated to a solid, porous, readily rehydratable product.

3. The process of claim 2 wherein the hot air temperature is in the range about from 130° to 180° F.

4. The process of claim 2 wherein the hydrophilic colloid is albumin.

5. The process of claim 2 wherein the hydrophilic colloid is dried egg white.

References Cited in the file of this patent

UNITED STATES PATENTS

| | | |
|---|---|---|
| 2,393,561 | Perech | Jan. 22, 1946 |
| 2,396,561 | Flosdorf | Mar. 12, 1946 |
| 2,400,460 | Hall | May 14, 1946 |
| 2,490,951 | Dunkley | Dec. 13, 1949 |
| 2,557,155 | Strashun | June 19, 1951 |
| 2,858,226 | Kaufman et al. | Oct. 28, 1958 |

FOREIGN PATENTS

| | | |
|---|---|---|
| 524,371 | Great Britain | Aug. 5, 1940 |